United States Patent [19]
Sarma

[11] 3,978,290
[45] Aug. 31, 1976

[54] DIGITAL PRIVATE AUTOMATIC BRANCH EXCHANGE

[76] Inventor: Bhupendra Nath Sarma, 72 Scales Road, London, N.17, England

[22] Filed: Oct. 8, 1974

[21] Appl. No.: 513,062

[30] Foreign Application Priority Data
July 12, 1974 United Kingdom............... 31008/74

[52] U.S. Cl......................... 179/15 AT; 179/18 AD
[51] Int. Cl.² .......................................... H04J 3/00
[58] Field of Search.......... 179/15 At, 15 A, 18 AD, 179/18 J

[56] References Cited
UNITED STATES PATENTS

| | | | |
|---|---|---|---|
| 3,492,430 | 1/1970 | Vigliante........................ | 179/18 AD |
| 3,740,484 | 6/1973 | Laggy et al..................... | 179/15 AT |
| 3,761,624 | 9/1973 | Lewis et al..................... | 179/15 AT |
| 3,804,989 | 4/1974 | Carbrey.......................... | 179/15 AT |
| 3,828,146 | 8/1974 | Lewis............................. | 179/15 AT |
| 3,885,103 | 5/1975 | Smith et al..................... | 179/15 AT |

Primary Examiner—Douglas W. Olms
Attorney, Agent, or Firm—Edwin E. Greigg

[57] ABSTRACT

A private automatic branch exchange utilizing PCM (pulse code modulated) digital technology with a four wire non-blocking PCM network having an ability to provide a double (three port) connection for each inlet, on a digital basis is disclosed. As a result of the network various new functional arrangements are possible. The application of PCM for implementing PABX systems provides an opportunity to interface directly with a PCM trunk thereby eliminating the PCM to analog code conversion.

9 Claims, 6 Drawing Figures

DIGITAL PRIVATE AUTOMATIC BRANCH EXCHANGE

This invention relates to a private automatic branch exchange, and more particularly relates to applying pulse code modulated digital concepts to implement a four wire non-blocking network with the ability to provide a double (three port) connection for each inlet, on a digital basis.

In the fast developing art of digital PCM information transmission and switching as currently being applied to telecommunication system, digital PCM tandem switching systems are being developed for switching the PCM information on a digital basis. PCM time division multiplexed information transmission is now well developed and commercially available in two major international formats recomended by CCITT. These formats are generally referred to as the 32 channel European format and the 24 channel North American format (T1 format). It is only recently that the interest in digital switching where the PCM information is switched through digital cross points without converting back to conventional analog information is being developed. However, the digital switching art has been applied only to the tandem switching systems. It is only recently that these concepts are also being explored for local switching applications.

The techniques related to private automatic branch exchange and associated applications have not been implemented using PCM concepts. The underlying reason for the lack of PCM applications in this area is that the PABX requires an ability to provide double (three port) connection to interface with attendant operator for functions such as consultation, call waiting, transfer etc. Traditionally, the double (three port) connection function in a PABX is provided in the trunk circuit. It is provided by closing two metalic contacts. This conventional method provides the facility to add one more connection (connection of the 3rd. port) to a normal conversation in progress. However, it is limited to the number of trunk circuits. In this traditional method of providing double connection in analog systems, the analog waveforms from two ports are added and the sum is transmitted to the third port.

In a digital PCM system where the binary words represent voice samples, it is not practical to accomplish a double connection by providing additional metalic contact. This would mutilate the binary value of the samples. As a result, in a PCM system the implementation of the conventional approach would require conversion to analog information during double connection. This would require an analog matrix arrangement resulting in additional cost penalties. From this it is evident that, in a digital PCM PABX system, it would be desirable to provide double connection without converting the digital information to conventional analog signals. This invention specifically relates to providing a double (three port) connection for each inlet in a four wire non-blocking digital network. As a result of this network with an ability to provide double connection, the application of PCM concepts in a private automatic branch exchange becomes feasible. It should be emphasized that the double connection ability is provided in the PCM network and not in the trunk circuit.

Generally, in the private automatic branch exchange of the present invention, all the inlets are converted to commercial PCM coding format using analog to PCM conversion. These inlets include lines, trunks, operators etc. The remaining inlets such as PCM tones and direct PCM trunks are combined to form a time division multiplexed highway for the input to the non-blocking switching network. The four wire non-blocking digital network accepts PCM information from this highway and provides appropriate storage for performing the time switching function. The network has an ability to provide samples from two parties, as opposed to one party, at any one channel time. These two samples are appropriately combined either by addition or by comparison (in real time) to provide the effect of a double (three port) connection for all the channels. At the outgoing side of the network PCM values resulting from the combined samples are provided in the form of the time division multiplexed highway. This highway is demultiplexed to provide a group of channels for digital to analog conversion. After conversion to analog format the information is provided to appropriate inlets. The stored program common control interfaces with sense and control points from the lines, trunks, operator, PCM trunks and receivers. The common control also interfaces with the network. All the operator functions are performed by the common control. The tones are provided in their PCM format directly by storing PCM samples of the original analog waveform in the read only memories (ROMs).

THE DRAWINGS

The present invention will be particularly described with reference to the accompanying drawings in which.

Figure 3:
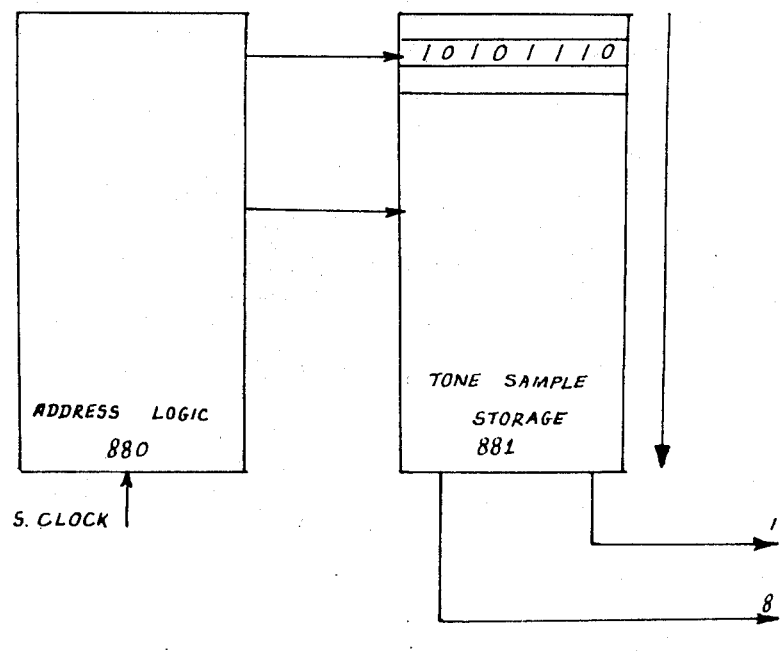

FIG. 3. represents the diagram of a PCM tone sender.

Figure 4:
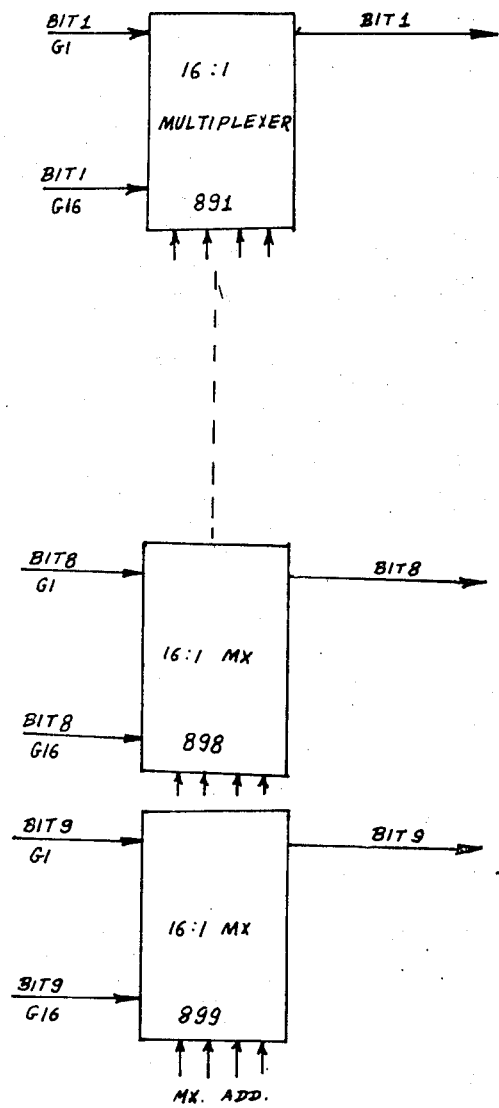

FIG. 4. represents the multiplexes circuit.

Figure 5:
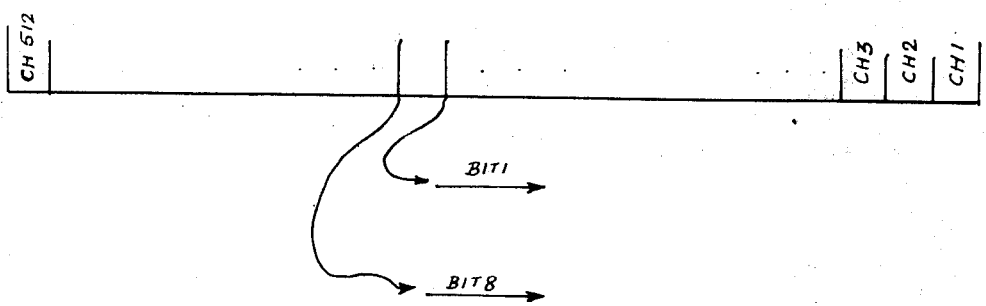

FIG. 5. represents the arrangement of the channels on a time division multiplexed highway.

Figure 6:
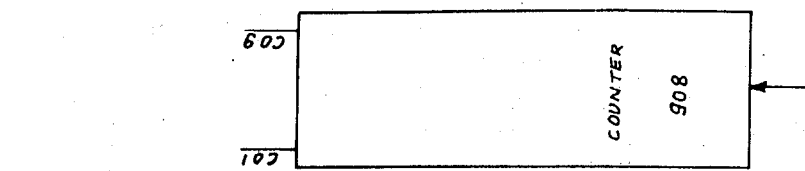
Figure 6:
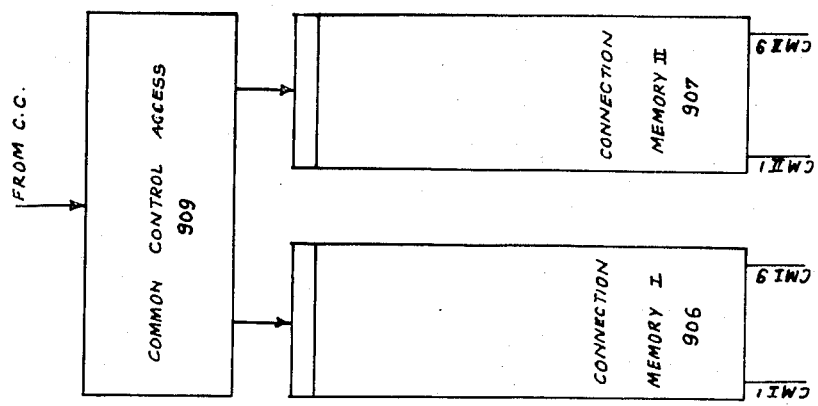
Figure 6:
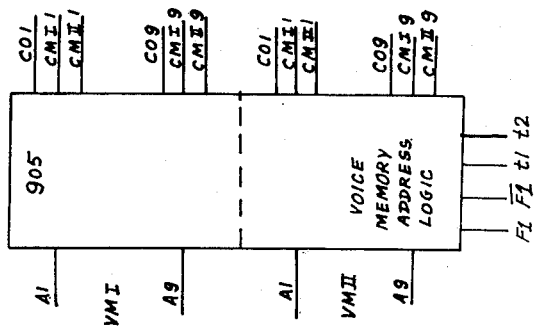
Figure 6:
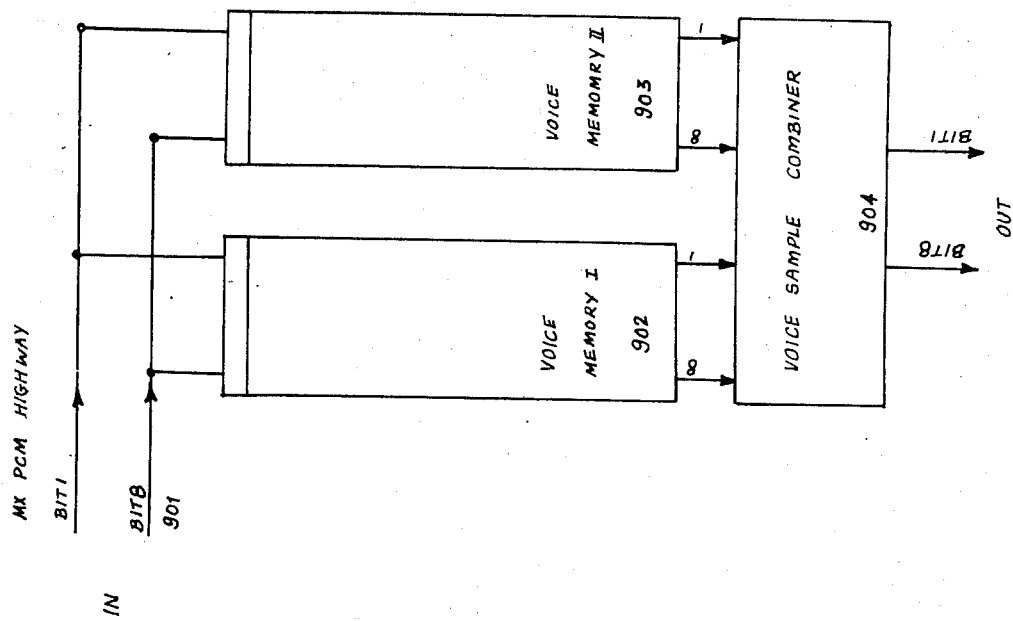

FIG. 6. represents the detailed diagram of the four wire non-blocking digital switching network.

DESCRIPTION OF THE INVENTION

Figure 1:
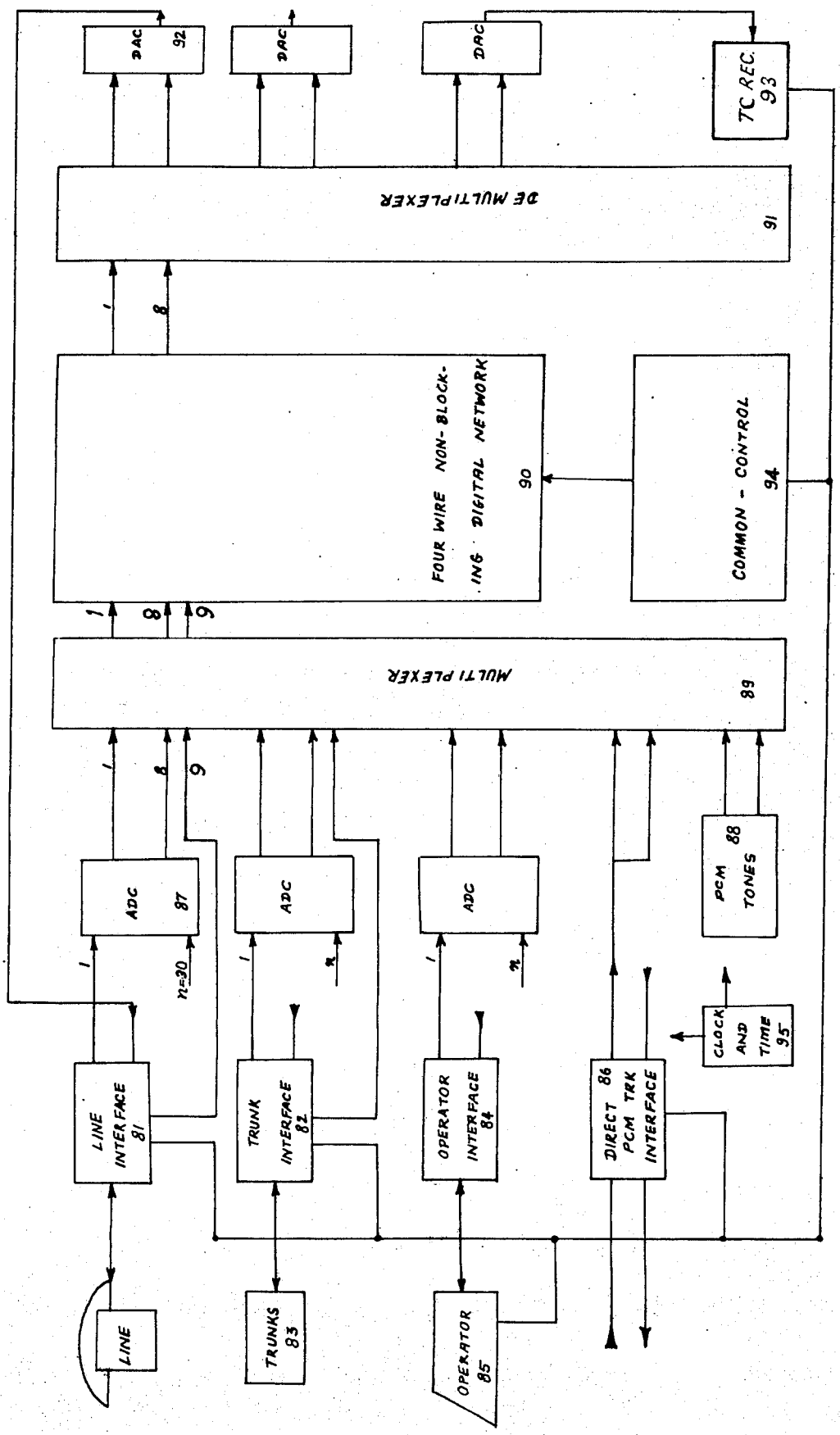
FIG. 1 represents the overall block diagram of the digital private automatic branch exchange.

A simplified view of the common control stored program digital PCM - PABX is shown in FIG. 1. The overall system is broken down into seven levels:

1. Inlets (lines, trunks 83, operators 85)
2. Inlets interfaces:
   Line interface 81 — to provide appropriate interface for the analog lines. This includes two wire to four wire conversion, sampling and appropriate signaling interface.
   Trunk interface 82 — to provide appropriate interface for the analog trunks. This includes, similar to line interface, two wire to four wire conversion (if needed), sampling and appropriate trunk signaling interface.
   Operator Interface 84 — to provide voice and control interface for the operator.
   Direct PCM trunk interface 86. — to interface directly with the outside span line carrying PCM trunks. This includes bipolar to unipolar conversion, clock derivation, framing pattern detection, synchronization, serial to parallel conversion, parallel to serial conversion, framing insertion, unipolar to bipolar conversion and appropriate signaling and alarm interface with the PCM signaling formats.

3. Code-conversion I

Analog to digital conversion ADC-87 — to provide code conversion similar to the A or MU law recomended by the CCITT standards.

PCM tones 88 — to provide direct PCM samples corresponding to the analog tone pairs.

4. Multiplexer 89 — to multiplex PCM information from ADC, direct PCM trunk interface and PCM tones to form a time division multiplexed highway for the network inlet.

5. Network 90 and common control 94 — to provide a four wire non-blocking digital network with an ability to provide double (three port) connection and to control the switching functions.

6. Demultiplexer 91 — to accept network outlet arranged in the form of a time division multiplexed highway and demultiplex the highway to provide a group of channels to appropriate code converter.

7. Code-convertors II

Digital to analog conversion DAC-92 — to provide PCM to analog conversion consistent with the commercial (CCITT recomended) formats.

The block diagram also shows:

Clock and timing circuitry 95, responsible for overall timing activities of the Private Automatic Branch Exchange. This clock is consistent with the frequency standards of the commercial PCM carrier systems. The touch calling receivers 93 receives analog information from DAC and detects the tone pair using conventional analog techniques.

The overall operation of the PABX system can be explained with reference to FIG. 1 as follows:

The analog information from the lines, trunks and operator is amplified, filtered and sampled (8 KHz) at appropriate interfaces to obtain a pulse amplitude modulated highway. The sampled information from 30 inlets (European format) is combined together for presenting it to the ADC. The ADC accepts this 30 channel pulse amplitude modulated highway and provides an eight bit binary representation consistent with the A law for each sample. The information from all such ADC and direct PCM sources such as PCM trunk interface and PCM tones is multiplexed to form a single PCM time division multiplexed highway. This highway is presented as an input to the four wire non-blocking digital network. On the out-going side of the network the information is received in the form of a highway similar to the incoming side. This highway is demultiplexed into separate groups of channels for each DAC. The DAC excerpts the eight bit PCM word and converts it to individual pulse amplitude modulated samples. From this highway the inlet interfaces receive appropriate pulse amplitude modulated samples through gating. These samples after proper filtering produces an analog waveform. Accordingly, it can be seen that in this PABX each inlet apparatus requires one two-way channel (transmit channel and receive channel). Any inlet generating analog information requires one channel on ADC. Similarly, any inlet receiving analog information requires one channel on the DAC.

The heart of the system consists of a four wire non-blocking digital network with an ability to provide double (three port) connection for each inlet. Due to the non-blocking network the assignment of each inlet is on a dedicated basis and thus the path is always assured. Since the system uses digital tone sources along with the non-blocking network each of the tones can be provided to all of the lines and trunks at the same time. The traditional function of providing line lockout can be accomplished by this feature.

Figure 2:
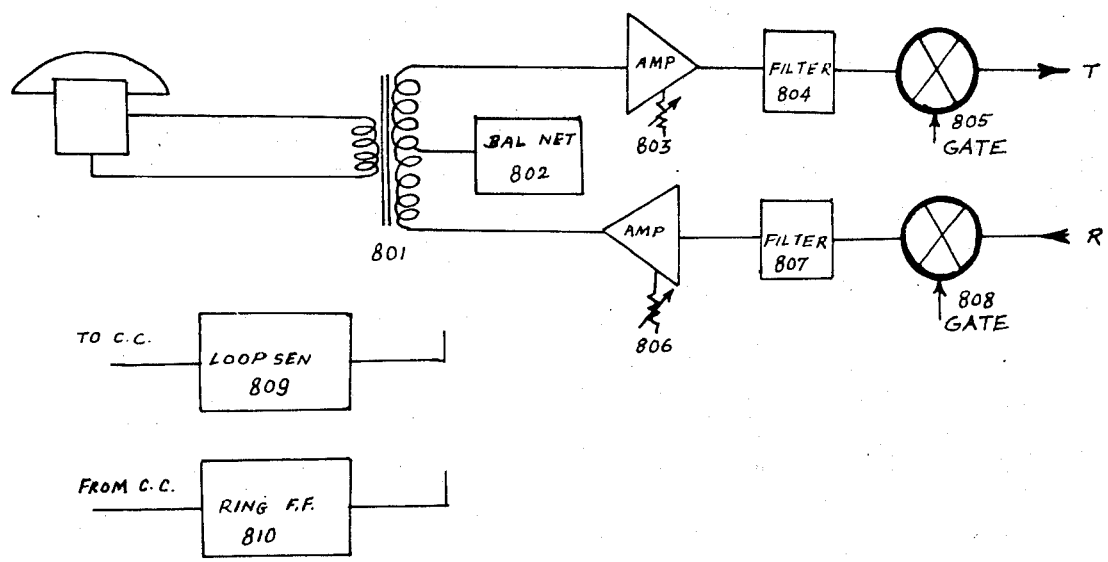
FIG. 2 represents the detail diagram of a typical line interface circuit.

FIG. 2 shows a simplified view of the line interface circuitry. In this arrangement the hybrid transformer 801 along with the balancing network 802 provides two wire to four wire conversion. The transmit side of the hybrid contains an amplifier 803, filter 804 and transmit gate for sampling at 8 KHz 805. The receive side consists of the receive gate 808, filter 807 and amplifier 806. This circuitry is similar to the conventional PCM processing hardware being utilized in the existing PCM carrier equipments. The line interface circuit also contains a signaling interface in the form of a loop sensor 809 and a ringing flip flop 810. The status of the loop sense is monitored and the status of the ringing is controlled by the common control.

FIG. 3 represents a simplified view of the tone sources. Each tone pair is presynthesized and PCM samples corresponding to the A law conversion are obtained. In order to generate the continuous waveform the samples for one complete cycle of the tone pair are stored in a read only memories 881. This read only memory is addressed sequentially by the address logic 880 under the control of the system clock. As a result, during each system frame (every 8 KHz) a PCM sample from each tone pair is available for the switching network. Each tone pair is normally assigned a specific channel location on the highway. In order to set up a connection between the tone pair and the inlet, the channel corresponding to the inlet is connected to the channel corresponding to the tone pair. This connection can be accomplished in one direction only. Corresponding receive channel can be assigned to the tone receiver.

FIG. 4 represents the multiplexer arrangement. In this case a 16 to 1 commercially available, multiplexer circuit is used to multiplex one bit each from 16 different groups (such as 14 ADC, one direct PCM trunk interface and one PCM tone source). FIG. 4 also shows the ninth bit which is a supervision bit taped directly from the line and trunk interface circuitry. This bit can be utilized to provide concentration of the signaling information at the switching network. The multiplexed address required for the multiplexer circuitry can be provided by a simple four bit binary counter.

FIG. 5 represents a 512 channel time division multiplexed highway which serves as an input and an output to the switching matrix.

A simplified view of the four wire non-blocking PCM digital network is shown in FIG. 6. It consists of:

Voice memory I 902.
Voice memory II 903.
Voice sample combiner 904.
Voice memory address logic 905.
Connection memory I 906.
Connection memory II 907.
Counter 908.
Common control access 909.

The fundamental idea is to store the information from the PCM highway 901 and provide the information from two channels under the control of the connection memories for the voice sample combiner. The voice sample combiner combines PCM information from the two channels and presents it for outpulsing.

The voice memory is addressed either from the counter 908 for writing voice samples or from the connection memories for reading voice samples. Two voice memories are utilized due to the high speed of the read and write operations. In this arrangement while voice memory I is being written with the incoming voice samples the voice memory II is read under the control of the connection memories for outpulsing. The next system frame, the voice memory I is read for outpulsing and voice memory II is written sequentially under the control of the counter 908. If the high speed memories are available such that three basic operations (one write and two reads) can be provided in a system channel time only one voice memory would be required.

The two connection memories contain information related to the connection between two channels on the PCM highway. The connection memory I provides the normal network connection. The connection memory II provides any additional connection necessary for providing three port connection. The connection memories are written by the common control at random and contain information necessary to set up a network path. These memories are read sequentially under the control of the system clock. The output from these memories serve as an address for voice memories to provide information for outpulsing. For example, if channel 2 is to be connected to channel 512 the connection memory in storage location two contains the binary representation of number 512; and in storage location 512 it contains the binary representation of number 2. This information is written into the control memories by the common control through common control access 909. Since the overall objective is to connect any two of the 512 channels the connection memories requires nine bits for addressing. It should be emphasized that the connection memories contain the network map which is instantly accessible by the common control for any verification or manipulation.

In a normal operation each channel is written sequentially into a fixed location in any one of the voice memories. For example, at the channel 2 time, first the information related to channel 2 is written into the voice memory I. Then the connection memory corresponding to channel 2 is read for addressing the voice memory II which is not being written. The content of the voice memory, say 512 at the address 2, is read out. After this operation channel 2 from the connection memory II is read for addressing the voice memory. This provides a PCM sample from the channel engaged in a double connection. Let us say connection memory II contains 256 in channel 2. Once these two samples from channel 512 and 256 are presented to the voice sample combiner circuit they are processed in real time. The processing could include a simple comparison such that the PCM sample corresponding to the highest magnitude of the two is sent for outpulsing. If the improved speech quality is desired, it is possible to combine the PCM samples from two channels by addition process for outpulsing.

The comparison can be accomplished by commercially available four bit comparator circuitry. It should be emphasized that during a particular channel in each system frame three basic operations are performed:

1. Write voice memory I under the control of the counter 908.
2. Read voice memory II under the control of the address provided through connection memory I 906.
3. Read voice memory II under the control of the address provided by the connection memory II 907.

The hardware implementation of the network arrangement is fairly simple and thus various configurations should be obvious to those practicing the art of digital logic design. The voice and connection memories 902, 903, 906, 907 can be implemented using commercially available (256×1) random access memories (RAM) with internal decoding arrangements. The counter 908 can be implemented using a minimum of three four bit binary counters (commercially available on a single device). The voice memory address logic 905 consists of 4 to 1 data selector circuits used in a 3 to 1 address selector application. The voice sample combiner 904 consists of two eight bit registers and two, four bit comparator circuits utilized in tandem to compare the eight bit PCM samples. If an adder is desired various other circuit approaches are available in the literature.

The network arrangement described in the present invention results in various advantages. It provides a double (three port) connection facility for every one of the inlets at minimum cost due to implementation of the double connection hardware (comparison etc.) to perform on line processing in the network. As a result of the addition of the double connection hardware the normal network operation is not disturbed. The network is still modular and due to its digital nature obviates the problems related to loading etc. Due to the four wire nature of the network it provides the flexibility of receiving information from one source and sending it to the other source.

I claim:

1. A telecommunication switching system for switching between line, trunk, and operator inlets, comprising:
    an input time division multiplexed highway and an output time division multiplexed highway;
    a four wire, non blocking digital PCM switching network having a plurality of input ports connected to said input time division multiplexed highway and a plurality of output ports connected to said output time division multiplexed highway;
    a plurality of line, trunk, and operator inlet interface means for forming pulse amplitude modulated (PAM) highways;
    means for connecting PCM trunks directly to said switching network through said input time division multiplexed highway;
    means for connecting PCM tones directly to said switching network through said input time division multiplexed highway;
    analog-to-digital conversion (ADC) means for converting said PAM highways to PCM information;
    means for multiplexing said PCM information from said ADC means, direct PCM trunk connecting means, and PCM tone connecting means, to form said input time division multiplexed highway;
    means for demultiplexing said outlet time division multiplexed highway to provide a group of channels;
    digital-to-analog conversion (DAC) means for providing PCM to analog code conversion of said channels; and
    a means for providing said four wire, non-blocking digital network with an ability to provide double connection (three port) between said plurality of input ports.

2. A telecommunication switching system in accordance with claim 1 wherein said four wire, non-blocking digital switching network comprises a plurality of voice memories equal in capacity to the said input ports, connection memories, counter logic, voice memory address logic, common control access logic and voice sample combiner.

3. A telecommunication switching system in accordance with claim 2 wherein the number of ports in said input time division multiplexed highway is equal to the number of words in said plurality of voice memories which are addressable by the number of bits in the plurality of connection memories for random reading and by the counter logic means for sequential writing.

4. A telecommunication switching system in accordance with claim 3 wherein said voice memories are addressed by the plurality of connection memories containing information regarding a network connection to be established, in particular a first connection memory containing the information regarding a normal two port connection and a second connection memory containing the information regarding an additional third port connection.

5. A telecommunication switching system in accordance with claim 4 wherein said three port connection arrangement comprises;
a plurality of voice sample input from the input time division multiplexed highway for writing the voice memory means;
a plurality of output from the voice memories obtained by addressing through said connection memories for reading;
means for combining voice sample by a comparison method in said voice sample combiner circuit;
a means for combining voice sample by an addition method in said voice sample combiner circuit; and
a time division multiplexed highway arrangement from the said voice sample combiner circuit.

6. A telecommunication switching system in accordance with claim 5 wherein said third port connection arrangement further comprises:
a voice memory address logic to address said voice memories through an address provided by said connection memories and said counter logic.

7. A telecommunication switching system in accordance with claim 1 wherein said PCM tones are available for outpulsing at the same time to all the necessary ports on the said input time division multiplexed highway arrangement.

8. A telecommunication switching system in accordance with claim 1 wherein operator functions are performed through a plurality of common control means due to the non-blocking arrangement of said four wire, non-blocking digital network with an ability to hold third party conversation in said control memory arrangement.

9. A telecommunication switching system in accordance with claim 1 wherein a network map is provided in said control memories accessable by said common control means.

* * * * *